Patented Oct. 9, 1923.

1,469,863

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing.      Application filed April 5, 1921. Serial No. 458,750.

*To all whom it may concern:*

Be it known that I, WILLIAM R. WEBB, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in methyl and ethyl alcohol or benzyl acetate, it has been found that such single solvents by themselves do not dissolve a sufficient proportion of the ethers to make a desirably thick flowable composition or dope, such as may be used in the manufacture of photographic film base by customary methods, or in the other plastic arts.

I have discovered that an adequately strong and useful solvent may be prepared by mixing benzyl acetate with one or more of the lower monohydroxy aliphatic alcohols. By the latter term I include the members containing less than six carbon atoms. For example, I may use from 90 to 50 parts of benzyl acetate and 10 to 50 parts by weight of methyl alcohol. By way of further illustration, I may employ equal parts of benzyl acetate and ethyl alcohol. While the amount of ether that may be dissolved in such compound solvents may be varied as desired over a large range, it is noted, for the sake of example, that 1 part by weight of water-insoluble ethyl cellulose, when dissolved in 5 parts of one of the above compound solvents, yields a thick, viscous, flowable solution. Homologues of benzyl acetate act equivalently.

Other substances which impart additional suppleness or incombustibility or other qualities, to the film may also be added to the dope, such, for instance, as triphenyl or tricresyl phosphate, camphor, etc. In the formation of the film, a considerable amount of benzyl acetate is left therein, due to its relatively low volatility. It imparts useful properties to such film.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A viscous flowable film-forming composition, comprising a cellulose ether dissolved in a mixture containing benzyl acetate and a lower monohydroxy aliphatic alcohol.

2. A viscous flowable film-forming composition, comprising an alkyl ether of cellulose dissolved in a compound solvent containing from 90 to 50 parts by weight of benzyl acetate and 10 to 50 parts of a lower monohydroxy aliphatic alcohol.

3. A composition of matter comprising 1 part of water-insoluble ethyl cellulose dissolved in approximately 5 parts of a compound solvent containing benzyl acetate and methyl alcohol.

4. A composition of matter comprising a cellulose ether and benzyl acetate.

5. As an article of manufacture, a flowed or deposited flexible transparent film, comprising a water-insoluble ethyl ether of cellulose and benzyl acetate.

Signed at Rochester, New York, this 26th day of March, 1921.

WILLIAM R. WEBB.